Jan. 30, 1951   D. G. MAGILL   2,539,450
METHOD OF PRODUCING FIBER TUBING
Filed Nov. 21, 1946
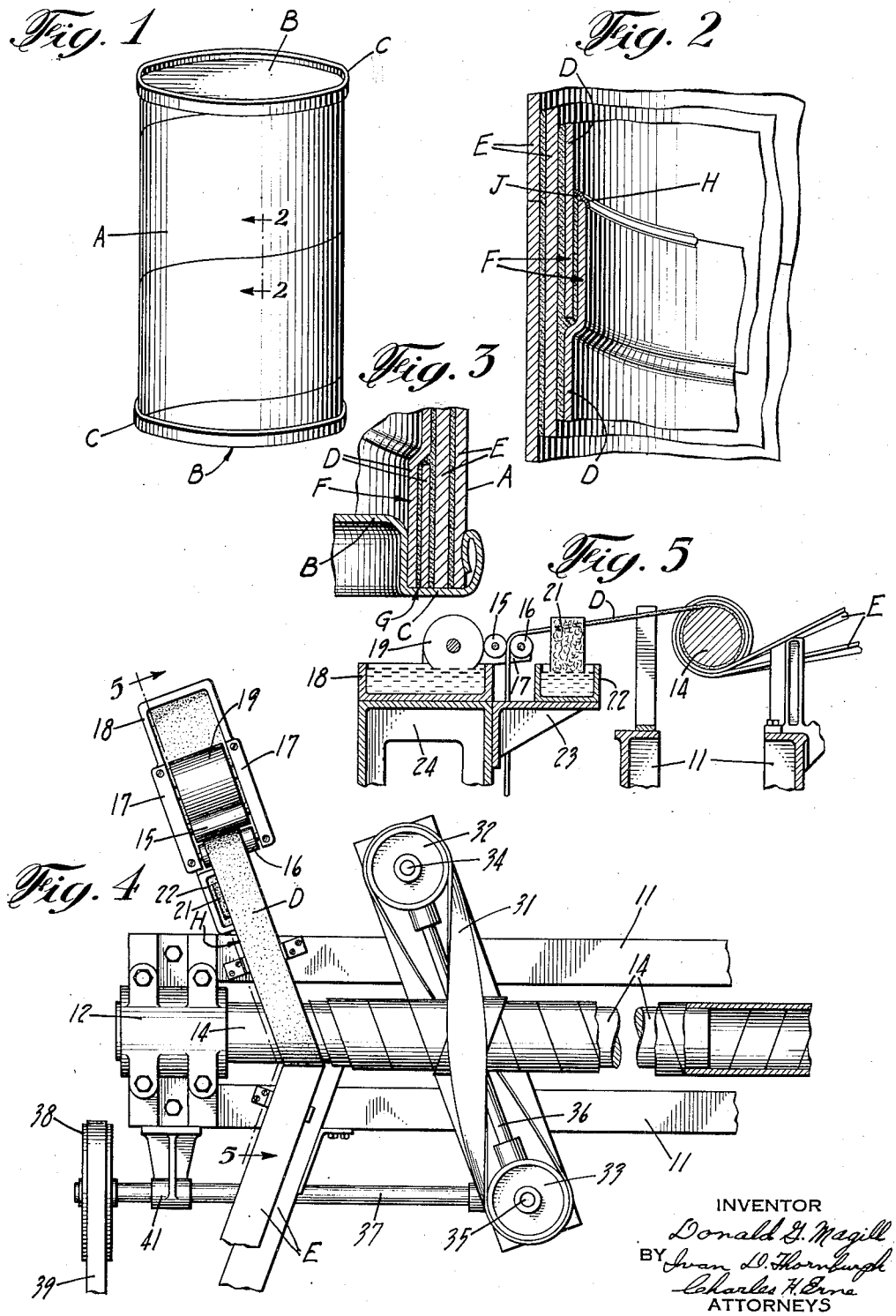
INVENTOR
Donald G. Magill
BY Ivan D. Thornburgh
Charles H. Erne
ATTORNEYS Patented Jan. 30, 1951

2,539,450

UNITED STATES PATENT OFFICE 2,539,450

METHOD OF PRODUCING FIBER TUBING

Donald G. Magill, Great Neck, N. Y., assignor to American Can Company, New York, N. Y., a corporation of New Jersey Application November 21, 1946, Serial No. 711,439

6 Claims. (Cl. 93—80)

The present invention relates to a method of producing fibre tubing from which containers or cans are made and has particular reference to producing fully sealed inner seams in the tubing.

For many years attempts have been made to produce commercial helically wound containers using as an inner ply various grease-proof sheeting such as metallic foil, cellophane, parchment, glassine and the like. While the attempts have been partially successful by applying the adhesive to the overlap of the spiral seam, it has been very difficult to regulate the application of the adhesive due to the fact that there is a natural oscillation in the operation of a spiral winder which makes it impossible to index such application accurately.

Part of the time the adhesive is applied too far away from the seam edge of the overlapped portions of the liner sheet. Hence the seam edge is unsealed and loose and this provides an undesirable open channel which extends along the seam edge and into the end seams of the container. When such a container is used for greasy products, especially oils or the like, the free edge of the seam soon permits leakage of the product through the liner sheet seam with the result that the softer outer layers of the container become wet and thus hasten the break-down of the container. The open channel permits liquid contents of the container to leak out through the end seams.

At other times the adhesive is applied so close to the seam edge that excessive amounts of the adhesive are extruded from between the lapped sections of the liner sheet. This extruded adhesive is picked up by the mandrel of the machine on which the tubing is wound and causes the tubing to stick fast to the mandrel. This results in frequent shutting down of the machine. In some cases the sticking of the adhesive to the mandrel is prevented by heavily lubricating the mandrel. This lubricant is picked-up by the tubing and thus leaves an objectionable coating on its inside surface which renders containers made from such tubing unfitted for use for food or other products.

The instant invention contemplates overcoming these difficulties and utilizing the close-to-the-edge application principle by a method of treating the excess adhesive as it is extruded from the lapped seam edge so that it forms a seam sealing bead along the exposed edge of the seam. This treatment of the excess adhesive is of such a nature as to prevent sticking of the adhesive to the mandrel and it also permits of the full sealing of the overlap along its entire width and length.

An object of the invention is the provision of a method of producing fibre tubing from which containers are made wherein the overlap seam of the inner or liner sheet is fully sealed by an adhesive interposed between the lapped portions of the sheet so that leakage of the product through the seam of a container made from such tubing will be prevented.

Another object is the provision of such a method of producing fibre tubing wherein excess adhesive extruded from the lapped seam portions of the liner sheet is treated for preventing it from adhering to the tube winding mandrel thereby preventing the tubing from sticking to the mandrel.

Another object is the provision of such a method of producing fibre tubing wherein the treatment of the extruded adhesive converts the adhesive into a non-sticking bead disposed along the exposed edge of the seam and sealing the seam against leakage therethrough of the contents packed into a container made from such tubing.

Another object is the provision of such a method of producing fibre tubing wherein the finished interior surface of the tubing is free from any objectionable lubricating material or the like so that the tubing may be readily utilized for food or other products requiring sanitary packaging.

Another object is the provision of such a method of producing fibre tubing wherein a cheaper and thinner liner sheet may be used in the tubing without sacrificing any of the advantages for which a liner sheet in such tubing is intended.

Numerous other objects and advantages of the invention will be apparent as it is better understood from the following description, which, taken in connection with the accompanying drawings, discloses a preferred embodiment thereof.

Referring to the drawings:

Figure 1 is a perspective view of a container having a fibre body lined with a fully sealed liner sheet in accordance with the instant method invention;

Fig. 2 is an enlarged fragmentary sectional view of the container shown in Fig. 1, the view illustrating the seam portion of the liner sheet;

Fig. 3 is a view similar to Fig. 2 and showing a cut-off section of the bottom end of the container;

Fig. 4 is a top plan view of one form of apparatus for carrying out the steps of the instant method invention, with parts broken away; and Fig. 5 is a sectional view taken substantially along the broken line 5—5 in Fig. 4.

As a preferred embodiment of the instant invention the drawings disclose a method of commercially producing helically wound fibre tubing having an inner or lining sheet of grease-proof material, such as for example metallic foil, cellophane, parchment, glassine, or the like, and adapted for use in making containers A (Fig. 1) for packing oils or greasy products. The container is fitted preferably with metal top and bottom members B secured in place by end seams C (Fig. 3). The invention, however, is equally well adapted for use in making tubing for waterproof and moisture-proof containers as well as oil-proof containers.

In accordance with the present method invention the tubing is helically wound upon a forming mandrel. A liner sheet or strip D is first wound upon the mandrel and over this liner strip a plurality of body sheets or strips E (Figs. 3 and 4) of chipboard or the like material are wound to produce a stiff tube of a plurality of layers. The liner strip D preferably is parchment material of a few thousandths of an inch in thickness and as it is wound on the mandrel its inner edges are overlapped to provide a lap seam F (Fig. 2). The overlying body strips E are usually wound from the opposite side and in staggered relation with their seam edges abutting in order to produce a smooth tube.

The various strips, constituting the different plies or layers of the tubing are secured together with a suitable adhesive and are subjected to external pressure for bonding the plies together. The adhesive for the liner strip preferably is a grease-proof adhesive and is applied directly to the outer surface of the liner strip. This application of the adhesive to the liner strip fills all the minute pores of the strip with the adhesive and thus greatly enhances the grease-proofness of the strip. It also insures full coverage with adhesive of the overlapping or seam edge portion of the strip and performs a positive sealing of the entire overlap, the adhesive in the overlap or rather between the overlapped edges of the liner strip, extending throughout the lapped seam to its outer exposed edge as shown in Fig. 2. It is this complete bonding of the overlapped edges of the liner strip that prevents the forming of an open channel adjacent the seam edge at a point marked G in Fig. 3 and thus prevents leakage through the seam into the end seams of a container made from such tubing.

In order to prevent transfer to the mandrel of any excess adhesive that may be extruded from the lapped seam onto the inner surface of the liner strip when the formed tubing is subjected to its bonding pressure, a very thin almost negligible continuous film H (Fig. 2) of mineral oil or other repelling covering agent is applied to the outer edge of the overlapping marginal portion of the strip as it is wound on the mandrel. Any mineral oil of the type which is odorless, tasteless and non-toxic is suitable for this purpose. This thin film of mineral oil spreads over the adhesive as it is extruded from the lapped seam F and thus negatives the sticking action. In other words, the oil acts as a repelling covering agent between the adhesive and the mandrel and prevents sticking.

The effect of the oil on the adhesive is to cause the latter to roll up into a bead J (Fig. 2) along the exposed edge of the lap seam as the tubing slides along the mandrel. The bead J of adhesive soon dries and thus efficiently seals and oil-proofs the exposed edge of the seam. In this manner the excess adhesive is prevented from causing the tubing to stick onto the mandrel and is utilized also to provide an oil-proof barrier at the entrance of the lap seam.

If desired a mineral or organic completely volatile covering material, such as petroleum ether, methyl-ethyl-ketone or the like, may be substituted for the mineral oil. Such covering materials perform the same function as the mineral oil but completely volatilize and disappear after forming of the bead J of adhesive and thus leaves the inside of the tubing free from any residual material.

In some cases it may be desired, as a modified form of the invention, to quickly set or harden the excess adhesive to produce the oil-proof barrier or bead J, as the adhesive is extruded from the lap seam F. In such cases, a hardening or solidifying chemically reacting agent may be applied to the edge of the liner strip in substitution for the mineral oil. Where a grease-proof adhesive of gelatinous or proteinaceous materials is used to bond the lap seam, such a solidifying chemically reacting agent may be potassium dichromate, tannic acid, formaldehyde or the like substances which react with animal gelatins or proteinaceous fluids to harden them and render them water insoluble. The conversion of the excess adhesive into the sealing bead J, in this case, is brought about by a chemical reaction between the adhesive and the solidifying agent as distinguished from the mechanical covering of the bead as when the mineral oil is used.

In either the chemical or the mechanical covering treatment of the bead J the same result is obtained, that is the production of an oil-proof barrier at the edge of the seam which barrier will not transfer to the forming mandrel or cause sticking of the tube thereto. Expressed in slightly different language, the extruded adhesive is rendered non-sticking. This treatment of the excess adhesive permits of applying sufficient adhesive to the lap seam to insure complete bonding of the entire extent of the lapped portions of the seam and insures against separation of the seam parts thus avoiding any leakage therethrough of the contents packed into a container made from such tubing.

One form of apparatus for effecting the steps of the instant method invention is disclosed in Figs. 4 and 5. These figures illustrate the principal parts of a helical tube winding machine such as the one disclosed in my United States Patent 1,689,593, issued October 30, 1928, on "Process and Apparatus for Forming Greaseproof Fibre Containers." Such a machine comprises primarily a main frame 11 carrying a clamp block 12 which supports one end of a stationary, horizontally disposed, cylindrical mandrel 14. It is onto this mandrel that the liner strip D and the overlying body strips E are wound together to produce the tubing from which the container bodies A are made.

The various strips D and E are passed onto the mandrel 14 at predetermined angles thereto so as to produce a helically wound tube with the edges of the strips in proper relation as hereinbefore explained. As the strips are passed onto the mandrel the adhesive, hereinbefore mentioned, is applied to certain of them.

The adhesive for the liner strip D is applied to the outer surface of the strip by way of an applying roller 15 and a pressure roller 16 between which the strip passes. These rollers are journaled in bearing blocks 17 which are bolted to an adhesive pot or reservoir 18 containing a supply of the adhesive. The adhesive is spread upon the applying roller 15 by a spreader roll 19 which frictionally engages the applying roller and which rotates in the adhesive in the reservoir. This spreader roller is journaled in the bearing blocks 17.

The film of mineral oil, volatile materials, or the solidifying chemically reacting agent hereinbefore mentioned in connection with the forming of the seam sealing bead J, is applied by a wick 21 which engages against the proper edge of the adhesive coated liner strip D as it passes onto the mandrel. This wick is disposed between the adhesive reservoir 18 and the mandrel 14 and is immersed in a bath of the mineral oil, the volatile material, or the solidifying chemically reacting agent, as the case may be, contained in a tank 22. The tank is supported on a bracket 23 which is bolted to a sub-frame 24 which serves as a support for the adhesive reservoir 18.

The adhesive for the body strips E may be applied in the usual manner, such as that disclosed in my above mentioned Patent 1,689,593.

The tubing resulting from these various adhesively coated strips D and E is wound on and advanced along the mandrel 14 by a continuously moving endless belt 31 which is carried on pulleys 32, 33. The belt is wrapped around the mandrel so that the tubing will pass between the belt and the mandrel. This arrangement of the belt on the mandrel exerts considerable pressure on the strips D, E so that they are formed into a compact body wall with complete bonding of the strips together. It is this pressure of the belt that insures fully bonding and sealing of the lap seam F of the liner strip D.

It is also this pressure of the belt that usually extrudes the excess adhesive from the seam. According to the present invention such excess adhesive is acted upon by the mineral oil, the volatile material, or the solidifying chemically reacting agent, whichever is used, and the seam sealing bead J results. Such a bead as has already been fully explained prevents transfer of adhesive to the mandrel where it would cause sticking of the tubing onto the mandrel. As the tubing advances along the mandrel it is cut off into proper lengths in any suitable manner, thus producing the container bodies A.

The belt pulleys 32, 33 are mounted on vertical shafts 34, 35 respectively, which are rotated in unison and in opposite directions by a suitable connection, such as by bevel gearing, to a cross shaft 36. This shaft is rotated by connection with a main driving shaft 37 having a driving pulley 38 which is revolved in any suitable manner, as by a belt 39. The drive shaft is journaled in bearing brackets 41 bolted to the main frame 11.

It is thought that the invention and many of its attendant advantages will be understood from the foregoing description, and it will be apparent that various changes may be made in the steps of the process described and their order of accomplishment without departing from the spirit and scope of the invention or sacrificing all of its material advantages, the process hereinbefore described being merely a preferred embodiment thereof.

I claim:

1. A method of producing fibre tubing from which containers are made, which comprises winding under pressure upon a tube forming mandrel a plurality of layers of sheet material one over the other with an adhesive between the layers for bonding them together while overlapping and securing the edge portions of the inner layer to produce a tight inside seam, sufficient adhesive being present between said overlapping edge portions to cause extrusion of said adhesive when said layers are wound upon each other under pressure, and prior to said winding step, applying a fluid treating material to said edge portions on the adhesive coated surface of said inner layer of sheet material to nullify the adhesiveness of said adhesive extruded past said edge portions at said inside seam during said winding step and thereby prevent adhesion of the tubing to the mandrel.

2. A method of producing fibre tubing from which containers are made, which comprises winding under pressure upon a tube forming mandrel a plurality of layers of sheet material one over the other with an adhesive between the layers for bonding them together while overlapping and securing the edge portions of the inner layer to produce a tight inside seam, sufficient adhesive being present between said overlapping edge portions to cause extrusion of said adhesive when said layers are wound upon each other under pressure, and, prior to said winding step, applying a fluid treating material to the inner edge and marginal portion of the adhesive coated surface of said inner layer for engagement by and treatment of said excess adhesive when it is extruded past said inside seam during said winding step to nullify its adhesiveness and thereby prevent adhesion of the tubing to the mandrel.

3. A method of producing fibre tubing from which containers are made, which comprises winding under pressure upon a tube forming mandrel a plurality of layers of sheet material one over the other with an adhesive between the layers for bonding them together while overlapping and securing the edge portions of the inner layer to produce a tight inside seam, sufficient adhesive being present between said overlapping edge portions to cause extrusion of said adhesive when said layers are wound upon each other under pressure, and, prior to said winding step, applying a film of mineral oil to the inner edge and marginal portion of the adhesive coated surface of said inner layer for engagement by said excess adhesive when it is extruded past said inside seam during said winding step for covering the extruded adhesive to nullify adhesion of the tubing to the mandrel.

4. A method of producing fibre tubing from which containers are made, which comprises winding under pressure upon a tube forming mandrel a plurality of layers of sheet material one over the other with an adhesive between the layers for bonding them together while overlapping and securing the edge portions of the inner layer to produce a tight inside seam, sufficient adhesive being present between said overlapping edge portions to cause extrusion of said adhesive when said layers are wound upon each other under pressure, and, prior to said winding step, applying a volatile fluid treating material to the inner edge and marginal portion of the adhesive coated surface of said inner layer for covering the adhesive as it is extruded past said inside seam during said winding step to nullify adhesion of the tubing to the mandrel, said fluid treating material volatilizing after the tubing leaves the mandrel to free the mandrel and the tubing of residue treating material.

5. A method of producing fibre tubing from which containers are made, which comprises winding under pressure upon a tube forming mandrel a plurality of layers of sheet material one over the other with an adhesive between the layers for bonding them together while overlapping and securing the edge portions of the inner layer to produce a tight inside seam, sufficient adhesive being present between said overlapping edge portions to cause extrusion of said adhesive when said layers are wound upon each other under pressure, and, prior to said winding step, applying an adhesive setting fluid material to the inner edge and marginal portion of the adhesive coated surface of said inner layer, said fluid material chemically reacting with said adhesive as the adhesive is extruded past said inside seam during said winding step to quickly set it for nullifying adhesion of the tubing to the mandrel.

6. A method of producing fibre tubing from which containers are made, which comprises applying a grease-proof adhesive to a liner sheet over all of one surface, helically winding the coated liner sheet onto a tube forming mandrel with the uncoated surface of the sheet in contact with the mandrel while overlapping and securing the edge portions of the liner sheet to produce a tight inside seam, winding a body sheet under pressure over the top of the adhesive coated surface of the liner sheet for producing a stiff tube, sufficient adhesive being present between the overlapping edge portions of the liner sheet to cause extrusion of the adhesive when said body sheet is wound upon said liner sheet under pressure, and, prior to said winding step, applying a fluid treating material to an edge and marginal portion of the adhesive coated surface of the liner sheet as it is wound onto said mandrel for engagement by said excess adhesive when it is extruded past said inside seam during said winding step for treating the extruded adhesive to nullify adhesion of the tubing to the mandrel.

DONALD G. MAGILL.

REFERENCES CITED

The following references are of record in the file of this patent:

UNITED STATES PATENTS

| Number | Name | Date |
| --- | --- | --- |
| 945,862 | Osborn | Jan. 11, 1910 |
| 1,047,946 | Jenkins | Dec. 24, 1912 |
| 1,689,593 | Magill | Oct. 30, 1928 |
| 1,716,424 | Conti | June 11, 1929 |
| 1,990,481 | Garling | Feb. 12, 1935 |
| 2,130,605 | Staude | Sept. 20, 1938 |